United States Patent
Ridpath et al.

[11] 3,967,238
[45] June 29, 1976

[54] LOW-BRAKE FLUID SENSOR

[75] Inventors: Robert R. Ridpath, Rosemont, Pa.;
Louis R. Clifford, Woodbury;
Hendrik Groot, Cherry Hill, both of N.J.

[73] Assignee: TRW Inc., Los Angeles, Calif.

[22] Filed: Dec. 16, 1974

[21] Appl. No.: 532,882

[52] U.S. Cl. .............................. 340/59; 340/244 C
[51] Int. Cl.² ........................................ G08B 21/00
[58] Field of Search ............. 340/59, 244 C, 244 R,
340/52 B, 52 C; 200/190, 187, 188

[56] References Cited
UNITED STATES PATENTS 3,312,936   4/1967   Huntzinger ......................... 340/59

*Primary Examiner*—Alvin H Waring
*Attorney, Agent, or Firm*—Poms, Smith, Lande & Glenny

[57] ABSTRACT

A liquid level sensor for sensing the levels of brake fluid in the master cylinders of a vehicle having probes for insertion into the fluids of the master cylinders and threshold detector circuits, associated with the probes and having an integrator coupled to the probes for providing a signal to activate a warning mechanism such as a lamp when the level of the liquid in either cylinder falls below a predetermined level. A protection circuit is coupled to the threshold detector circuits for protecting them against excessive transient voltages or a reverse supply potential. An additional circuit is coupled to a monitoring system which monitors the differential pressure switch which is activated in response to a difference in pressure in the two master cylinders. A self-check circuit is also coupled to the threshold detectors to activate the warning lamp in response to a signal from the ignition switch. The threshold detectors are failsafe in that a failed detector will activate the alarm indicating a failure rather than permit it to go undetected.

16 Claims, 3 Drawing Figures

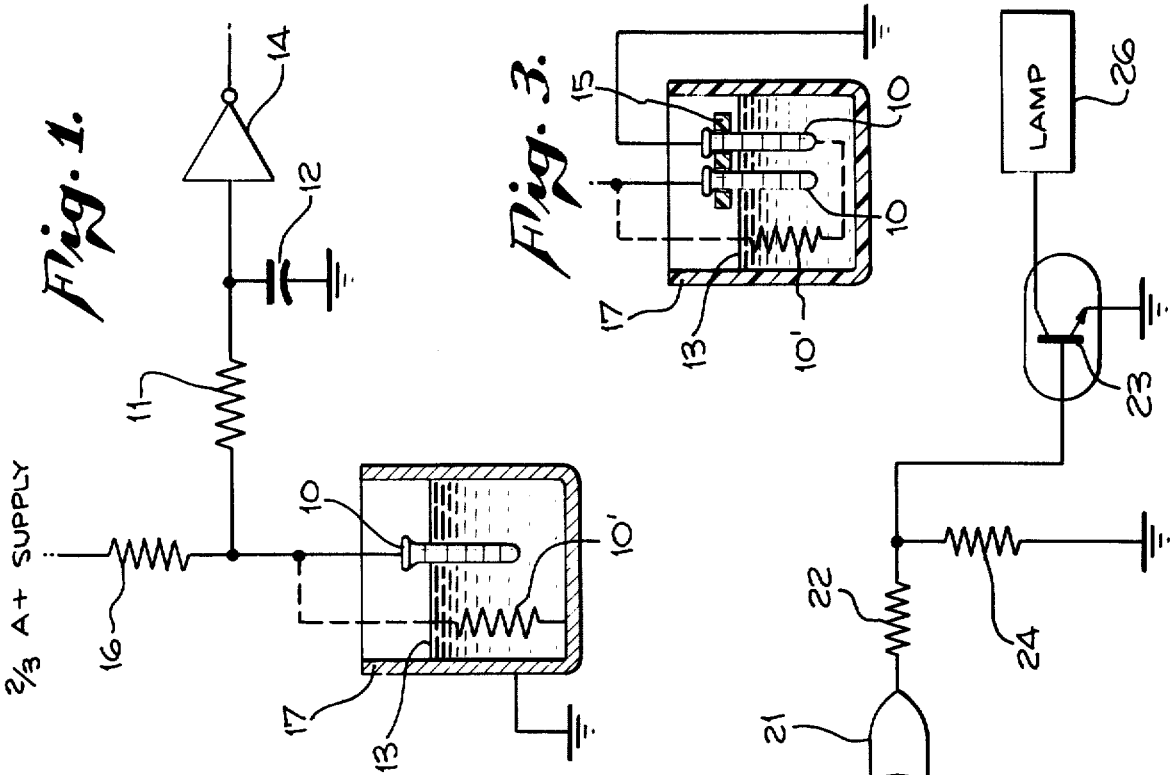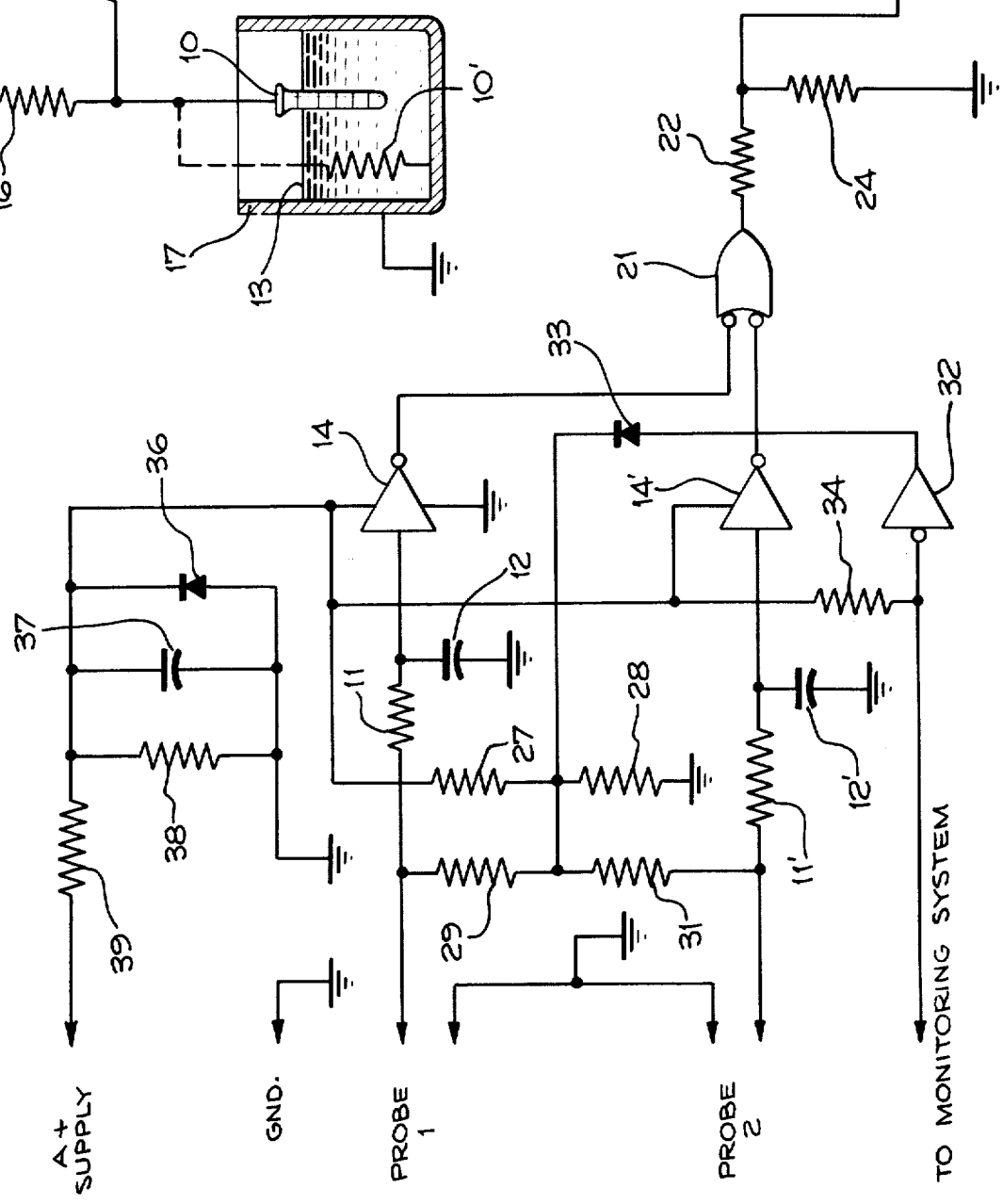

LOW-BRAKE FLUID SENSOR

BACKGROUND OF THE INVENTION

The present invention relates to a liquid level detector and more particularly to a sensor for sensing the levels of brake fluid for providing a warning signal when the amount of brake fluid falls below a predetermined level.

The problems of detecting the presence of hydraulic fluid in moving vehicles are numerous. These problems are caused by vehicle acceleraton or deceleration which causes the fluid to splash and often signal a false alarm This problem is further caused by lateral shift of the fluid due to change in attitude of the vehicle.

The detection problem is further aggravated when the vehicle is used in environments having a wide range of temperatures. The change in temperature has a substantial effect on the resistivity of the fluid. The resistivity of the brake fluid increases as the temperature decreases. This often causes the signalling of a false alarm by brake fluid detection devices which detect fluid levels by measuring the electrical resistance through the fluid.

Another problem in the detection of the presence of brake fluid is caused by ionization of the fluid by devices which utilize the resistivity of the fluid. This ionizaton is frequently caused by detection devices which measure liquid levels as a function of the resistivity of the fluid by applying an electrical current through that fluid. A high electrical current causes ionization of the fluid which in turn causes a breakdown in the structure of rubber seals which thereby reduces their effectiveness.

Various prior art mechanical devices have been used for detecting liquid level. Such devices frequently employ a float on the liquid which moves up and down as a function of the level of the liquid. Such devices do not provide self-check circuitry. Furthermore, they do not have the reliability of electronic switching devices. Furthermore, these devices are particularly susceptible to false alarms due to change in vehicle attitude and/or acceleration.

Various prior art electronic devices have been employed to detect fluid level. Such devices frequently employ field effect transistors (FET) or high-gain bipolar transistors. Such devices have been characterized by excessive probe current requirements which cause ionization of the fluid. The circuitry of such devices generally does not perform well over wide ranges of temperature. Generally, these devices do not have protection against transient and reverse supply potential and do not have self-check capability.

SUMMARY OF THE INVENTION

The present invention solves this problem by providing a liquid level detector using probes having low currents in the order of 1 to 5 microamps. The probes are coupled to detector circuits having signal integrators for providing an integration of the signal over a time period to thereby avoid a false alarm due to a momentary shift in attitude of the vehicle or due to vehicle acceleraton. The detector circuits are each coupled to a single signalling device such as a lamp to provide an alarm signal when the fluid falls below a predetermined level.

The present invention further provides for compensation of the circuitry over a wide range of temperatures such as in the order of −40° C. to +125° C. This is achieved by providing a reduced supply voltage to the probe and detector circuits and adjusting the detector threshold. This has the effect of preventing a high potential from being applied to the detector circuits when the resistance of the fluid increases due to a reduction in the temperature. Thus, the circuit prevents false alarms due to reduced temperature in the fluid.

The system is made failsafe by the construction of the circuitry to provide a signal if the probe or probe lead is broken. This is attained in one embodiment by grounding the container in which the probe is inserted. In this embodiment, the probe is effectively series connected through the fluid to the container. In a second embodiment, designed to accommodate a nonconductive container, two probes are fixedly mounted on a nonconductive member and effectively series connected through the fluid. If a probe or probe lead in either embodiment is broken, the resistance becomes effectively infinite and the signalling device provides an alarm signal.

A self-check circuit is operative to test a substantial portion of the remainder of the circuit by activation of the lamp to indicate proper circuit operation in response to external inputs. The self-check circuit is further coupled to a monitoring system such as the stanzdard automobile monitoring system to provide a signal in response to a difference in pressure in the master cylinders. The self-check circuit further checks for continuity in the lamp circuit of the standard monitoring system.

The invention further provides protection means in the form of a protection circuit coupled to the threshold detectors to protect them against excessive transient voltages or a reverse supply potential. This protection circuit is preferably formed of a passive network consisting of a resistor, a capacitor and a diode all coupled in parallel with the parallel connection series connected to the detector power supply circuit.

Accordingly, an object of the present invention is to provide means for detecting fluid levels.

Another object is to provide means for detecting the level of hydraulic brake fluid without ionizing the fluid.

Yet another object of the present invention is the provision of integration circuits for integrating electric signals from the probes to the detector circuits to provide an accurate indication of the level of the fluid which is independent of the attitude of the vehicle in which the device is mounted as well as the temperature of the fluid.

Still another object is to provide means for checking various components in a liquid level detection device to determine that the device is capable of correct level detection.

Yet a further object is to provide means for providing a visual indication in response to the difference in pressure in brake fluid in the master cylinders of vehicles.

Still a further object of the present invention is to provide means for preventing damage due to transients and reverse supply voltages in a liquid level detector.

Other objects, advantages and novel features of the present invention will become apparent from the following detailed description of the invention when considered in conjunction with the accompanying drawings.

BRIEF DESCRIPTION OF THE DRAWINGS

FIG. 1 is a simplified schematic diagram of the probe and detector circuit of the present invention; and FIG. 2 is a schematic diagram of the system of the present invention; and FIG. 3 is a simplified schematic diagram of the dual probe configuration for use with non-grounded reservoirs.

DETAILED DESCRIPTION OF THE PREFERRED EMBODIMENT

Referring now to FIG. 1, there is shown probe means, and detector circuit means shown as a probe 10 coupled to a resistor 11 and capacitor 12 to provide a signal indicative of the level of the fluid 13. The resistor-capacitor network performs integration of the signal and transmits it to an inverting amplifier 14 for providing a signal when the liquid 13 falls below a predetermined level.

In the operation of the probe and threshold detector circuit, a portion of the supply voltage is applied through current limiting means which includes resistor 16 to the probe 10. The fluid 13 is contained in a container 17, such as a master cylinder reservoir which is grounded as shown. The fluid 13 is somewhat conductive and the effective resistance is shown as resistor 10'.

Resistor 16 and resistor 10' form a voltage divider network with the potential between the two coupled through the integrator circuit formed of resistor 11 and capacitor 12. The integrator circuit integrates the voltages received from the voltage divider network and transmits it to the inverting amplifier 14. The resistor 11 and capacitor 12 thus provides filtering.

When the level of fluid 13 is high, the effective resistance of resistor 10' is relatively low and the potential across resistor 16 is transmitted to ground through the resistor 10'. This provides a relatively low input voltage through the integrator circuit to thereby apply a logic 0 input to the inverting amplifier 14. The inverting amplifier 14 inverts the signal to provide a logic 1 to circuit means shown as a NOR gate 21 shown in FIG. 2 which provides a low potential logic 0 output. The parameters of the inverting amplifier 14 and the NOR gate 21 are selected to provide proper probe to logic interfacing.

The output from NOR gate 21 is transmitted to switching means for switching state in response to a logic 1 from NOR gate 21. In the preferred embodiment, this includes a current limiting resistor 22 connected to the base electrode of a switching transistor 23. A resistor 24 keeps the potential applied to the base electrode of transistor 23 in a low voltage state to thereby render it nonconductive until a sufficiently high potential from the NOR gate 21 is applied to render the transistor conductive. This provides for switching at discrete voltage levels. The transistor 23 is coupled to a lamp circuit 26.

When fluid 13 falls below a predetermined level, the effective resistance 10' of the probe 10 increases to thereby increase the potential transmitted through the integrator network to the input of the inverting amplifier 14. The integrating network integrates the input voltage with respect to time to provide an output signal proportional to the voltage over a period of time determined by the RC time constant of the resistor 11-capacitor 12 network. Thus, the integrating network prevents the transmission of transient voltage signals caused by sudden fluid level changes between the probe 10 and the container 17 due to change in attitude of the vehicle or momentary splashing of the liquid caused by acceleration.

The increase in voltage on the output of the integrating network due to a reduced level of the fluid 13 applies a logic 1 input to the inverting amplifier 14 to cause it to generate a logic 0 output which is applied to the NOR gate 21 to generate a logic 1 output. The high potential logic 1 output from the NOR gate 21 is transmitted via resistor 22 to the base electrode of the transistor 23 to render the transistor conductive to activate the lamp 26 to provide a warning signal to the vehicle operator that the liquid has fallen below the safe level.

Thus, the integrating network reduces the possibility of false alarms due to splash of the fluid caused by temporary misdistribution of the fluid within the container 17. The reduced voltage supply applied through resistors 16 and probe 10 provides a relatively low current to the fluid 13 in the order of several microamps. This prevents ionization of fluid. The ionization of the fluid is particularly harmful to rubber seals which come into contact with the fluid. The structure of the rubber is changed by the ionization of the fluid to thereby render the seals less effective. This problem of ionization in fluid inherent in various prior art devices is thereby avoided by the present invention.

An inherent safety feature of the present invention is the series connection of the probe circuit to the grounded container 17. This provides a continuity check in the probe circuit. If a discontinuity occurs, the resistance of resistor 10' becomes effectively infinite to provide an alarm signal in the manner described above. This is commonly known as fail-safe design.

The embodiment shown in FIG. 3 is designed to accommodate a fluid container 17 which is not electrically conductive. In this embodiment dual probes 10 are fixedly mounted on a nonconductive member 15. The probes complete the electrical circuit and are effectively series connected through the fluid. One probe is coupled to the detector circuit and operative in the manner described above in conjunction with FIG. 1. The second probe is coupled to ground to provide the ground return path. This embodiment therefore also provides the fail-safe feature of the present invention.

The present invention may employ a plurality of probe means and detector circuits. In the embodiment shown in FIG. 2, circuitry is disclosed which accommodates two probe assemblies, each coupled to sense the level of liquid in one of the two standard master brake cylinder reservoirs in a standard vehicle. In the circuit shown in FIG. 2, the integrating network formed of resistor 11 and capacitor 12 is shown coupled to the input of inverting amplifier 14 in the manner described in FIG. 1. The integrating network formed of resistor 11' and capacitor 12' is shown coupled to the input of inverting amplifier 14' in the manner described in FIG. 1. The outputs of both of the inverting amplifiers 14 and 14' are coupled to circuit means for combining the outputs of the amplifier shown as NOR gate 21. A reduced level of liquid in either cylinder reservoir is thereby detected and a logic level is transmitted through current limiting resistor 22 to the transistor 23 to light the warning lamp 26 in the event the liquid in either master cylinder reservoir falls below a safe level.

Electrical supply means is provided which includes a voltage divider circuit having resistors 27 and 28 which develop a 2/3 supply voltage from the battery supply. This battery supply is applied to a current limiting circuit which includes resistor 29 and 31, each of which corresponds to resistor 16 shown in simplified form in FIG. 1.

The application of the lower voltage to the fluid provides compensation for change in temperature by causing a safe decision level margin to exist at all temperatures. Brake fluid has a characteristic of increased resistane at lower temperatures. This increase in resistance would tend to cause a false indication that the fluid has fallen below a safe level and thereby provides the display of a false alarm. The 2/3 supply voltage prevents the input voltage to inverting amplifiers 14 and 14' from reaching a magnitude corresponding to a logic 1 level when the resistance of the liquid increases due to decreased temperature. Thus, the reduced potential to the probe circuits caused by resistors 27 and 28 in conjunction with resistors 29 and 31 prevent a false alarm at reduced temperatures.

The resistors 29 and 31 limit the probe current to provide the low current feature of the present invention which, as indicated above, prevents ionization of the fluid in the master cylinders. The present invention uses CMOS (complimentary metal oxide silicon) integrated circuits to provide high input impedance of the amplifiers to thereby permit the circuit to be operative using low currents in the probes to prevent the ionization in the fluid.

Use of single F.E.T. or bipolar stages can result in ambiguous decision levels since the on-off decision point tends to vary over the temperature range. Dramatically improved decision level control can be attained by the use of CMOS design. Here one element of a single stage is always on, and the second element is off. The elements compliment when switching from one logic state to the other. Temperature effects, being complimentary, are therefore minimized.

The invention further provides self-check circuitry to permit verification of all of the active amplifier elements before each period of use. The self-check circuitry is shown in the form of a resistor 34 and an inverting amplifier 32. The amplifier 32 is coupled to the input of a diode 33 to generate a signal which is transmitted through the resistors 29 and/or 31 to the associated inverting amplifier 14 and/or 14' to activate the lamp 26 to display a warning signal when a short circuit occurs in the outputs of either amplifier 14 or 14' or the circuitry operatively coupled to the resistor 34. The self-check circuitry is further coupled to a monitoring system such as the standard automobile monitoring system (not shown) to provide a warning signal when the differential pressure switch is closed to indicate a differential in pressures between the master cylinders. The diode 33 is operative to isolate the amplifier 32 from the rest of the circuit.

In the operation of the self-check circuitry, the voltage supply is normally coupled through a resistor 34 to the input of the inverting amplifier 32. A positive voltage applied through the resistor 34 is operative to provide a logic 1 input to the inverting amplifier 32 under normal conditions. The inversion of the logic 1 input to generate a logic 0 output prevents the activation of either amplifiers 14 or 14'. Thus, under normal conditions, the self-check circuit does not enable transistor 23.

If the differential pressure switch is activated in response to a difference in pressure due to an inadequate amount of fluid in one of the two master cylinders or the monitoring system is activated, the resistor 34 is effectively grounded to thereby provide a logic 0 input to the amplifier 32. This is inverted to provide a logic 1 output which is transmitted through either amplifier 14 or 14' to activate the lamp 26 to display a warning/test signal in the manner described above.

The present invention provides means for providing protection to the circuit against excessive transient voltages or a reverse supply potential. In the preferred embodiment, this is shown as a protection circuit formed of a diode 36, a capacitor 37 and resistors 38 and 39. The resistors 38 and 39 form a voltage divider network which limits the supply voltage to a safe level during periods of startup during which time the supply voltage is sometimes doubled from an external source to insure a more rapid starting rotational speed in cold weather.

The protection means includes means for providing protection against reverse voltages. In the preferred embodiment this is shown as a diode 36.

The diode 36 of the protection circuit is particularly useful in the event of the inadvertent application of reverse supply potential or the application of a large negative transient. Under such circumstances the diode 36 becomes forward biased to shunt negative transient voltages to prevent any such negative transients from harming the remainder of the circuit.

Large positive transient voltages on a supply line are reduced to safe levels by the time constants of the resistor 39-capacitor 37 circuit operative in conjunction with the resistor 38. This circuitry provides filtering effect for any such large positive transients to further protect the circuitry. The protection circuitry permits the present invention to be constructed of less expensive parts since the parts remaining do not have to withstand the transients which they would otherwise be subjected to without the transient protection circuitry.

Obviously, many modifications and variations of the present invention are possible in light of the above teachings. For example, the circuit could be constructed using thick film hybrid technology. Although this would increase initial costs, it would decrease the size of the circuitry. Furthermore, the circuit could be built on an integrated chip to permit all the circuitry to be contained within the probe or other convenient location. It is therefore to be understood that within the scope of the appended claims, the invention may be practiced otherwise than as specifically described.

I claim:

1. A fluid sensor system for sensing the level of fluid in a container comprising:
   electrical supply means for supplying an electrical potential,
   electrical probe means coupled to said electrical supply means and inserted into the fluid for providing an electrical signal in proportion to the level of fluid in the container,
   detector circuit means coupled to said probe means for detecting said electrical signals, said detector circuit means including an integrator circuit coupled to said probe means for integrating said electrical signal with respect to time, said detector circuit further including an amplifier having an input coupled to the output of said integrating circuit for amplifying said integrated electrical signal, and
   switching means operatively coupled to said detector circuit means and responsive to said amplifier, said switching means being operable to be switched from one stable state to a second stable state in response to a predetermined signal from said detector circuit to provide an accurate alarm signal in response to a reduced level of said fluid.

2. The fluid sensor system of claim 1 and wherein said amplifier is an inverting amplifier and said detector circuit further includes a NOR gate having an input coupled to the output of said amplifier and an output coupled to said switching means.

3. The sensor as described in claim 2 and wherein said inverting amplifier and said NOR gate are formd of CMOS circuitry.

4. The fluid sensor system of claim 1 and wherein said switching means includes a transistor having an input coupled to said detector and responsive to said amplifier to be switched from said one stable state to said second stable state.

5. The sensor as described in claim 1, and wherein said electrical supply means includes current limiting circuit means for providing a relatively low current to said electrical probe means to thereby prevent ionization of the fluid.

6. The sensor as described in claim 1 and wherein said container is conductive and grounded and said electrical probe means is effectively series connected through the fluid to the container.

7. A fluid sensor system for sensing the level of fluid in a container comprising:
electrical supply means for supplying an electrical potential,
electrical probe means coupled to said electrical supply means and inserted into the fluid for providing an electrical signal in proportion to the level of fluid in the container,
detector circuit means coupled to said probe means for detecting said electrical signals, said detector circuit means including an integrator circuit coupled to said probe means for integrating said electrical signal with respect to time,
switching means operatively coupled to said detector circuit means for switching its state in response to a predetermined signal from said detector circuit to provide an accurate alarm signal in response to a reduced level of said fluid, and
protection means coupled to said electrical supply means for providing protection of said sensor from transient and reverse voltages, said protection means including a resistor-capacitor network coupled to said electrical supply means for providing protection from transient voltage and a diode coupled to said electrical supply means for shunting reverse voltages.

8. A system for sensing the level of fluids on the master cylinder reservoirs of a vehicle comprising:
electrical supply means for supplying an electrical potential
a plurality of probe means each coupled to said electrical supply means and each inserted into one of the cylinder reservoirs and each adapted to generate an electrical signal indicating the safe level presence of fluid in the associated cylinder reservoir,
a plurality of detector circuits each coupled to one of said probe means for detecting the electrical signal generated by the associated probe means, each of said detector circuits including an integrator circuit for integrating the associated electrical signal with respect to time, with each of said detector circuits further including an amplifier coupled to the output of the associated integrator circuit,
switching means coupled to the output of each detector circuit, said switching means being operable to switch from one stable state to a second stable state in response to a predetermined signal from any of said detector circuits to provide an alarm signal in response to a reduced level of liquid in either of said cylinders, and
self-check circuitry coupled to each of said amplifiers to provide an alarm signal in response to a malfunction in any of said amplifiers.

9. The system as described in claim 8 and wherein said self-check circuitry includes electrical circuit means coupled to said electrical supply means and each of said amplifiers for providing a normally high voltage logic 1 signal,
an inverting amplifier having an input coupled to said electrical circuit means, and
a diode coupled between the output of said inverting amplifier and each of said plurality of detector circuits for isolating the output of said inverting amplifier from the remainder of the system when the system is operating in the normal mode whereby a malfunction in any of said amplifiers is operative to change the logic state of said electrical circuit means from a logic 1 state to a logic 0 state to thereby activate said inverting amplifier to transmit a signal from said inverting amplifier to said detector circuits to signal a malfunction in one of said inverting amplifiers.

10. The system as described in claim 8 and wherein each of said amplifiers of said detector circuits is an inverting amplifier and further including a NOR gate with the output of each of said inverting amplifiers coupled to the input of said NOR gate, said NOR gate having an output coupled to said switching means with each of said inverting amplifiers and said NOR gate constructed to provide probe to logic interfacing.

11. The sensor as described in claim 7, and wherein said electrical supply means includes a voltage divider circuit and
a current limiting circuit operatively coupled to said voltage divider circuit for providing a relatively small current whereby the parameters of said voltage divider circuit and said current limiting circuit are adjusted to prevent false alarm signals over a wide range of temperatures.

12. The sensor as described in claim 7 and wherein said container is nonconductive and said electrical probe means includes two probes each fixedly mounted on a nonconductive supporting member and effectively series connected through the fluid.

13. The system as described in claim 10 and wherein said inverting amplifiers and said NOR gate are formed of CMOS design.

14. The system as described in claim 8 and wherein said self-check circuitry is coupled to a monitoring system which includes at least one differential pressure switch for monitoring the pressure in at least one master cylinder of the vehicle.

15. The system as described in claim 9 and wherein said electrical supply means includes a current limiting circuit for providing a relatively low current to said plurality of said probe means to thereby prevent ionization of said fluid, and
said diode is coupled to said current limiting circuit.

16. The system as described in claim 10 and wherein said electrical supply means includes:
a voltage divider circuit,
a current limiting circuit operatively coupled to said voltage divider circuit for providing a relatively small current whereby the parameters of said voltage divider circuit and said current limiting circuit are adjusted to prevent false alarm signals over a wide range of temperatures, and
said diode is coupled to said voltage divider circuit and said current limiting circuit.

* * * * *